(12) United States Patent
Kim et al.

(10) Patent No.: US 9,046,952 B2
(45) Date of Patent: Jun. 2, 2015

(54) DISPLAY DEVICE INTEGRATED WITH TOUCH SCREEN PANEL

(75) Inventors: Gun-Shik Kim, Yongin (KR); Dong-Ki Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 353 days.

(21) Appl. No.: 13/463,528

(22) Filed: May 3, 2012

(65) Prior Publication Data

US 2013/0162549 A1    Jun. 27, 2013

(30) Foreign Application Priority Data

Dec. 22, 2011   (KR) .......................... 10-2011-0140151

(51) Int. Cl.
*G06F 3/041*    (2006.01)
*G06F 3/044*    (2006.01)

(52) U.S. Cl.
CPC .............. *G06F 3/0412* (2013.01); *G06F 3/044* (2013.01); *G06F 2203/04103* (2013.01)

(58) Field of Classification Search
CPC ....... G06F 3/0412; G06F 3/044; G06F 3/045; G06F 2203/04103; G06F 3/0416; G06F 3/047; G06F 3/0414; G06F 2203/04111; G02F 1/13338; G02F 1/133512; G02F 1/133514; G02F 2001/134318; G02F 1/1362; G09G 2300/0426; G09G 3/3648
USPC .................. 349/80, 104–111; 345/22, 42, 88, 345/173–178, 589, 690, 694–696
See application file for complete search history.

(56) References Cited

U.S. PATENT DOCUMENTS

| | | | |
|---|---|---|---|
| 2005/0057708 A1* | 3/2005 | Kuo et al. ...................... | 349/106 |
| 2008/0062139 A1 | 3/2008 | Hotelling et al. | |
| 2009/0213096 A1* | 8/2009 | Kuo .............................. | 345/176 |
| 2009/0322702 A1* | 12/2009 | Chien et al. ................... | 345/174 |
| 2010/0060602 A1* | 3/2010 | Agari et al. ................... | 345/173 |
| 2010/0149116 A1* | 6/2010 | Yang et al. .................... | 345/173 |
| 2010/0214266 A1* | 8/2010 | Koshihara et al. ............ | 345/174 |
| 2011/0043487 A1* | 2/2011 | Huang et al. .................. | 345/175 |
| 2011/0080355 A1* | 4/2011 | Gruner et al. ................. | 345/173 |
| 2011/0242444 A1 | 10/2011 | Song | |
| 2011/0310056 A1* | 12/2011 | Chang ........................... | 345/174 |
| 2012/0062481 A1 | 3/2012 | Kim et al. | |

FOREIGN PATENT DOCUMENTS

| | | |
|---|---|---|
| KR | 10-2009-0019902 | 2/2009 |
| KR | 10-2011-0103052 A | 9/2011 |
| KR | 10-2011-0108886 | 10/2011 |
| KR | 10-2012-0060926 A | 6/2012 |

* cited by examiner

*Primary Examiner* — Amare Mengistu
*Assistant Examiner* — Gloryvid Figueroa-Gibson
(74) *Attorney, Agent, or Firm* — Christie, Parker & Hale, LLP

(57) ABSTRACT

A display device integrated with a touch screen panel. The display device includes a plurality of pixels formed on a substrate, color filter patterns on a surface of the display device, corresponding to the pixels and containing a conductive material, and a black matrix formed between the color filter patterns. Each of the color filter patterns is electrically connected to an adjacent one of the color filter patterns to be used as sense electrodes of a touch screen panel.

21 Claims, 2 Drawing Sheets

DISPLAY DEVICE INTEGRATED WITH TOUCH SCREEN PANEL

CROSS-REFERENCE TO RELATED APPLICATION

This application claims priority to and the benefit of Korean Patent Application No. 10-2011-0140151, filed on Dec. 22, 2011, in the Korean Intellectual Property Office, the entire content of which is incorporated herein by reference.

BACKGROUND

1. Field

The following description relates to a display device, and more particularly, to a display device integrated with a touch screen panel.

2. Description of the Related Art

A touch screen panel is an input device capable of selecting the indication content displayed on the screen of an image display device by a human hand or an object to input the command of a user.

Therefore, the touch screen panel is provided on the entire surface of the image display device to convert a contact position of the human hand or the object into an electrical signal. Therefore, the instruction contact selected in the contact position is received as an input signal.

Since the touch screen panel may replace or eliminate the need for an additional input device (such as a keyboard or a mouse) coupled to the image display device and to operate the image display device, the use of the touch screen panel is gradually increasing.

Methods of realizing the operation of the touch screen panel include a resistance layer method, a photo-sensing method, and a capacitance method. Among the above methods, the touch screen panel operated by the capacitance method senses a change in capacitance formed by a conductive sense pattern together with another peripheral sense pattern or a ground electrode when the human hand or the object contacts the touch screen panel to convert the contact position into electrical signal.

The touch screen panel is attached to the external surface of a flat panel display (FPD) such as a liquid crystal display (LCD) or an organic light emitting display. When an additionally manufactured touch screen panel and the FPD are attached to each other, the entire thickness of a product is increased and manufacturing cost is increased.

In addition, recently, flexible FPDs are being developed. In this case, the touch screen panel attached to the flexible FPD is to be also flexible.

SUMMARY

Accordingly, an aspect of an embodiment of the present invention is directed toward a display device integrated with a touch screen panel in which color filter patterns containing a conductive material are used as the sense electrode of the touch screen panel and in which connection lines for connecting color filter patterns driven by the sense electrode are formed in a region that overlaps a black matrix to reduce or minimize the thickness of the display device and to simplify manufacturing processes.

In an embodiment of the present invention to achieve the foregoing and/or other aspects of the present invention, there is provided a display device integrated with a touch screen panel. The display device includes a plurality of pixels formed on a substrate, color filter patterns on a surface of the display device (e.g., on a top surface of the display device), corresponding to the pixels and containing a conductive material, and a black matrix formed between the color filter patterns. Each of the color filter patterns is electrically connected to an adjacent one of the color filter patterns to be used as sense electrodes of a touch screen panel.

In one embodiment, the sense electrodes realized by the color filter patterns containing the conductive material include first sense electrodes formed to be connected to each other in a first direction and second sense electrodes formed to be connected to each other in a second direction. The first sense electrodes are electrically connected to each other by first connection lines for connecting the first sense electrodes in the first direction, and the second sense electrodes are electrically connected to each other by second connection lines for connecting the second sense electrodes in the second direction.

In one embodiment, the first sense electrodes and the second sense electrodes are configured so that the sense electrodes adjacent in a diagonal direction are connected to each other.

In one embodiment, the first sense electrodes are connected to the adjacent first sense electrodes in a form of up and down zigzag, and the second sense electrodes are connected to the adjacent second sense electrodes in a form of side to side zigzag.

In one embodiment, the first connection lines and the second connection lines are formed in a region that overlaps the black matrix.

In one embodiment, an insulating layer is interposed between the first connection lines and the second connection lines in a region where the first connection lines and the second connection lines intersect each other.

In one embodiment, the conductive material is one of metal nano particle, nano wire, and graphene.

In one embodiment, each of the first and second sense electrodes is realized by a group of color filter patterns containing at least two conductive materials.

In one embodiment, the color filter patterns included in the group of the color filter patterns realized as one of the first or second sense electrodes are electrically connected to each other by an internal connection pattern.

In one embodiment, the black matrix is formed on an entire region excluding the color filter patterns on the same surface as the color filter patterns.

In one embodiment, each of the pixels includes an organic light emitting diode (OLED) and a driving transistor connected to the OLED.

In one embodiment, an encapsulated thin film is formed on an entire surface of the OLED.

In one embodiment, a plurality of color filter patterns containing the conductive material and corresponding to the plurality of pixels are formed on the encapsulated thin film.

As described above, according to an embodiment of the present invention, the color filter patterns formed on the top surface of the display device and containing the conductive material are used as the sense electrodes of the touch screen panel and the connection lines for connecting the color filter patterns that operate as the sense electrodes are formed in the region that overlaps the black matrix so that it is possible to reduce or minimize the thickness of the entire display device and to simplify the manufacturing processes.

In addition, when the display device is realized as the organic light emitting display including the encapsulated thin film, since the color filter patterns formed on the encapsulated thin film and containing the conductive material may be used as the sense electrodes of the touch screen panel without the use of the polarizing plate provided to secure contrast, it is possible to reduce or minimize the thickness of the display device and to realize a flexible display device.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
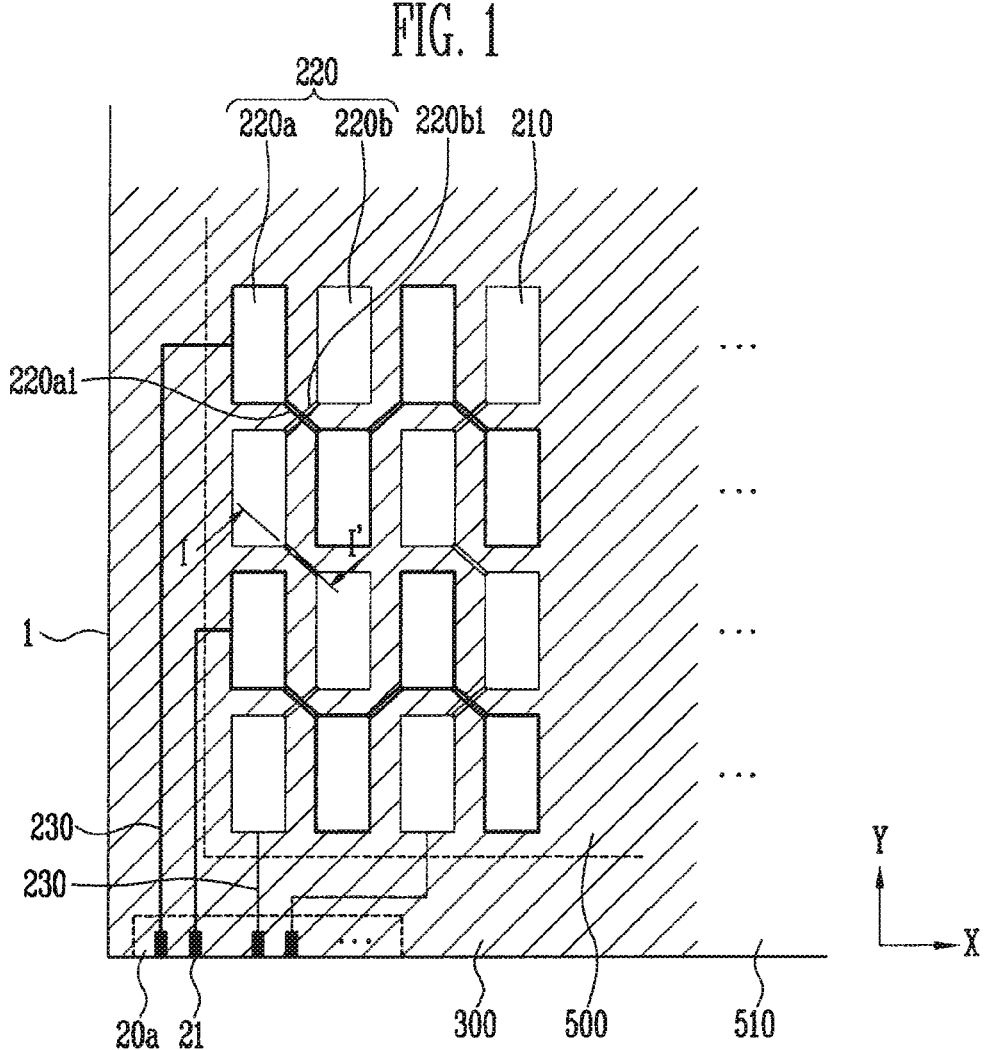
FIG. 1 is a plan view schematically illustrating a partial region of a top surface of a display device integrated with a touch screen panel according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements.

Hereinafter, the embodiments of the present invention will be described in detail with reference to the accompanying drawings.

Figure 2:
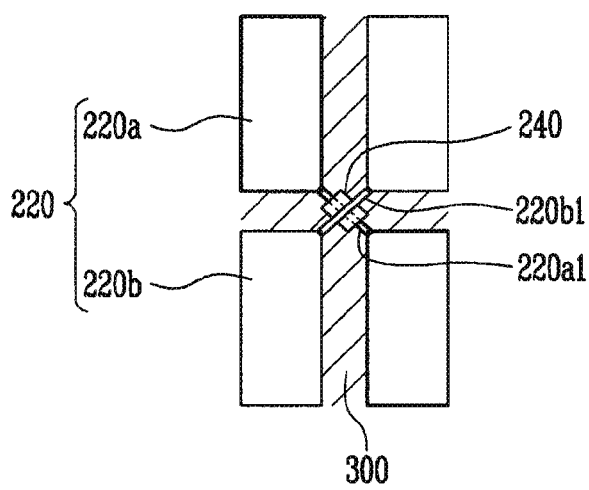
FIG. 2 is an enlarged view of a main part illustrating an example of a sense electrode illustrated in FIG. 1.

FIG. 1 is a plan view schematically illustrating a partial region of a top surface of a display device integrated with a touch screen panel according to an embodiment of the present invention. FIG. 2 is an enlarged view of a main part illustrating an example of a sense electrode illustrated in FIG. 1.

In one embodiment, a display device integrated with a touch screen panel is provided. Referring to FIGS. 1 and 2, the touch screen panel according to an embodiment of the present invention uses color filter patterns 210 formed in a top surface 1 of the display device as sense electrodes 220.

Here, the top surface 1 of the display device faces (or corresponds to) a bottom substrate of the display device on which a plurality of pixels (not shown) are formed and may be realized as a surface of a top substrate or an encapsulated thin film.

That is, the plurality of color filter patterns 210 are formed in the top surface 1 of the display device to correspond to the plurality of pixels formed on the bottom substrate, and a black matrix 300 is formed between the color filter patterns.

In addition, the display device may be an organic light emitting display or a liquid crystal display (LCD).

In the embodiment of the present invention illustrated in FIGS. 1 and 2, the color filter patterns 210 formed in the top surface 1 of the display device and containing a conductive material are used as the sense electrodes 220 of the touch screen panel, and connection lines 220a1 and 220b1 for connecting the color filter patterns 210 that operate as the sense electrodes 220 are formed in the region that overlaps the black matrix 300.

The color filter patterns 210 correspond to the plurality of pixels formed on the bottom substrate of the display device and may be formed by a material for realizing red, green, and blue.

As an example, the adjacent three color filter patterns 210 realize red, green, and blue, respectively, so that the three color filter patterns may form one unit pixel. In this case, the pixels on the bottom substrate corresponding to the three color filter patterns form one unit pixel.

According to the embodiment of the present invention, the color filter patterns 210 represent red, green, and blue and realize the operations of the sense electrodes 220 of the touch screen panel as described above. Therefore, the color filter patterns 210 contain a conductive material.

Here, the conductive material may be metal nano particle, nano wire, and/or grapheme.

That is, after mixing the conductive material with the material that realizes the color filter patterns, the mixture is formed on the top surface of the display device using a printing process to realize the color filter patterns 210 according to the embodiment of the present invention.

Therefore, although the color filter patterns 210 and the sense electrodes 220 in FIG. 1 are denoted by different reference numerals, they are the same elements.

The touch screen panel according to the embodiment of the present invention includes the sense electrodes 220 realized by the color filter patterns containing the conductive material and sense lines 230 for connecting the sense electrodes 220 to an external driving circuit (not shown) through a bonding pad unit 20a. Here, the bonding pad unit 20a includes a plurality of bonding pads 21 connected to the sense lines 230.

Here, the region in which the plurality of sense electrodes 220 are formed corresponds to the plurality of pixels (not shown) formed on the bottom substrate of the display device and is a display region 500. The region in which the sense lines 230 electrically connected to the sense electrodes 220 and the bonding pad unit 20a are formed is a non-display region 510 provided around the display region 500.

The non-display region 510 is covered with the black matrix 300 realized by a material that does not transmit light as illustrated in the drawing. The black matrix 300 is formed between the color filter patterns 210 formed in the display region 500.

Referring to FIGS. 1 and 2, the structure of the touch screen panel according to the embodiment of the present invention will be described in more detail as follows.

The sense electrodes 220 realized by the color filter patterns 210 containing the conductive material are realized by a plurality of first sense electrodes 220a formed to be connected to each other in a first direction (the X axis direction) and second sense electrodes 220b formed to be connected to each other in a second direction (the Y axis direction) as illustrated in FIG. 2.

Here, the first sense electrodes 220a are electrically connected to each other by first connection lines 220a1 for connecting the first sense electrodes 220a in the first direction, and the second sense electrodes 220b are electrically connected to each other by second connection lines 220b1 for connecting the second sense electrodes 220b in the second direction.

In the embodiment illustrated in FIGS. 1 and 2, the first sense electrodes 220a and the second sense electrodes 220b are realized so that sense electrodes adjacent in a diagonal direction are connected to each other. The first sense electrodes 220a are connected to the first sense electrodes 220a adjacent in the form of up and down zigzag. The second sense electrodes 220b are connected to the second sense electrodes 220b adjacent in the form of side to side zigzag.

In addition, as illustrated in FIGS. 1 and 2, the first connection lines 220a1 and the second connection lines 220b1 may cross or intersect each other and an insulating layer 240 for securing stability is interposed between the first connection lines 220a1 and the second connection lines 220b1 that cross or intersect each other.

As described above, the first and second connection lines 220a1 and 220b1 are completely covered by the black matrix.

That is, the first and second connection lines 220a1 and 220b1 are in one embodiment formed of an opaque low resistance material. Since the first and second connection lines 220a1 and 220b1 are formed to overlap the black matrix 300, it is possible to prevent the first and second connection lines 220a1 and 220b1 from being detected or recognized by a user of the touch screen panel.

In addition, the first and second connection lines 220a1 and 220b1 may be realized by printable conductive ink together with the sense electrodes 220 realized by the color filter patterns 210 containing the conductive material.

In addition, the sense lines 230 are electrically connected to the first and second sense electrodes (cells) 220a and 220b in units of first and second direction lines to connect the first and second sense electrodes 220a and 220b to an external driving circuit such as a position detection circuit through the bonding pad unit 20a.

The sense lines 230 are arranged in the non-display region 510 positioned around the display region in which an image is displayed. The range of choice of materials is large so that the sense lines 230 may be formed of a low resistance material such as Mo, Ag, Ti, Cu, Ti, and Mo/Al/Mo. Since the sense lines 230 are formed to overlap the black matrix 300, it is possible to prevent the sense lines 230 from being detected or recognized by the user.

The above-described touch screen panel is a touch screen panel operated by a capacitance method. Here, in operation, when a contact object such as a human hand or a stylus pen contacts the touch screen panel, a change in capacitance in accordance with a contact position is transmitted from the sense electrodes 220 realized by the color filter patterns containing the conductive material to a driving circuit via the sense lines 230 and the bonding pad unit 20a. Then, the change in the capacitance is converted into an electrical signal by an X and Y input process circuit so that the contact position is determined.

In the embodiment illustrated in FIGS. 1 and 2, the color filter patterns 210 containing the conductive material are used as the sense electrodes of the touch screen panel, which is for convenience of description. Here, in one embodiment, the sense electrodes 220 provided in the touch screen panel are formed to have a larger area than the pixels formed on the bottom substrate of the display device.

That is, in the embodiment illustrated in FIGS. 1 and 2, the sense electrodes 220 having the same area as the pixels formed on the bottom substrate of the display device are shown. However, the embodiment of the present invention is not limited to the above. Also, in one embodiment, the color filter patterns 210 containing the conductive material are grouped in uniform units so that the grouped color filter patterns may be used as one sense electrode.

Figure 3:
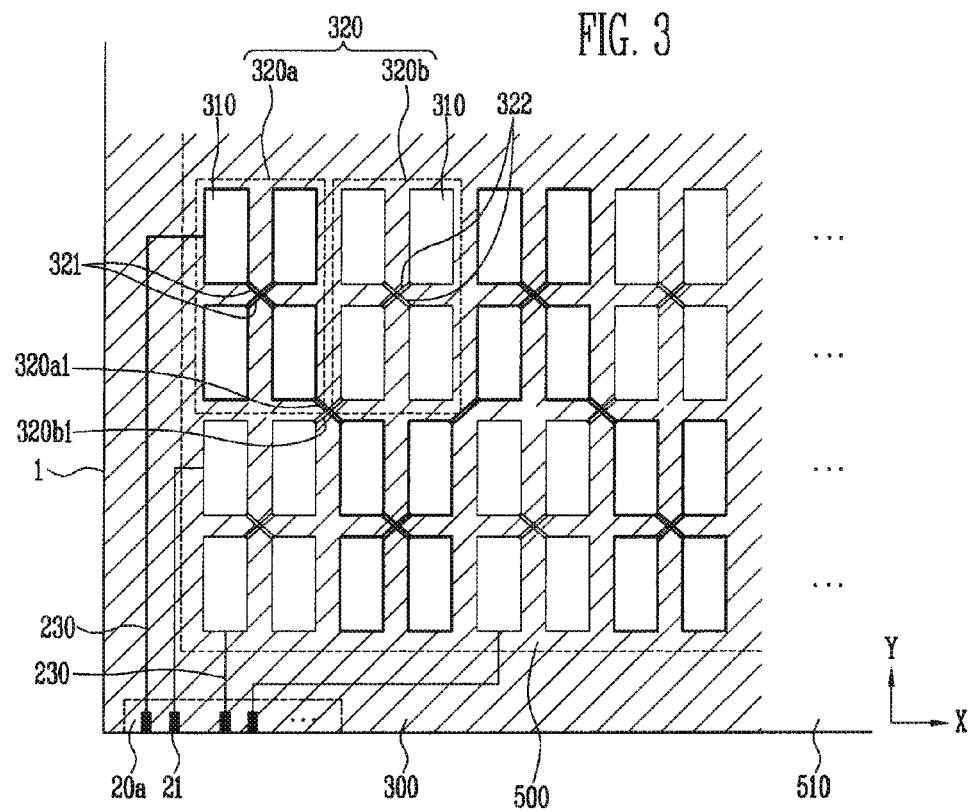
FIG. 3 is a plan view schematically illustrating a partial region of a top surface of a display device integrated with a touch screen panel according to another embodiment of the present invention.

In the embodiment illustrated in FIG. 3, a plurality of color filter patterns 310 are realized as (become) one sense electrode 320. In particular, four adjacent color filter patterns, that is, the color filter patterns 310 in units of 2*2 are realized as one sense electrode 320.

The above is only one embodiment according to the present invention, and it should be apparent to those skilled in the art that the sense electrodes 320 may be realized by the plurality of adjacent color filter patterns 310 in various groupings or combinations such as in units of 1*3, 3*1, 3*3, and 6*6.

FIG. 3 is a plan view schematically illustrating a partial region of the top surface of a display device integrated with a touch screen panel according to another embodiment of the present invention.

As described above, since the embodiment of FIG. 3 is different from the embodiment of FIGS. 1 and 2 only in that the four adjacent color filter patterns, that is, the color filter patterns 310 in units of 2*2 are realized as one sense electrode 320, the same elements as those of the embodiment of FIGS. 1 and 2 are denoted by the same reference numerals and detailed description thereof will be omitted.

Referring to FIG. 3, the four adjacent, that is, in units of 2*2 color filter patterns 310 realize one sense electrode 320. Here, the plurality of color filter patterns 310 that realize the one sense electrode 320 are electrically connected to each other through internal connection patterns 321 and 322.

The sense electrodes 320 realized by the plurality of color filter patterns 310 include a plurality of first sense electrodes 320a formed to be connected to each other in the first direction (the X axis direction) and second sense electrodes 320b formed to be connected to each other in the second direction (the Y axis direction).

At this time, the first sense electrodes 320a are electrically connected to each other by first connection lines 320a1 for connecting the first sense electrodes 320a in the first direction, and the second sense electrodes 320b are electrically connected to each other by second connection lines 320b1 for connecting the second sense electrodes 320b in the second direction.

In the embodiment illustrated in FIG. 3, the first sense electrodes 320a and the second sense electrodes 320b are realized so that the sense electrodes adjacent to each other in the diagonal direction are connected to each other. The first sense electrodes 320a are connected to the first sense electrodes adjacent in the form of up and down zigzag and the second sense electrodes 320b are connected to the second sense electrodes 320b adjacent in the form of side to side zigzag.

In addition, as illustrated in the drawing, the first connection lines 320a1 and the second connection lines 320b1 may cross or intersect each other and an insulating layer for securing stability is interposed between the first connection lines 320a1 and the second connection lines 320b1 that cross or intersect each other.

That is, the first and second connection lines 320a1 and 320b1 are in one embodiment formed of an opaque low resistance material. Since the first and second connection lines 320a1 and 320b1 are formed to overlap the black matrix 300, it is possible to prevent the first and second connection lines 320a1 and 320b1 from being detected or recognized by the user.

In addition, the first and second connection lines 320a1 and 320b1 may be realized by printable conductive ink together with the sense electrodes 320 realized by the color filter patterns 310 containing the conductive material.

In addition, the sense lines 230 are electrically connected to the first and second sense electrodes (cells) 320a and 320b in units of the first and second direction lines to connect the first and second sense electrodes 320a and 320b to an external driving circuit such as a position detection circuit through the bonding pad unit 20a.

Figure 4:
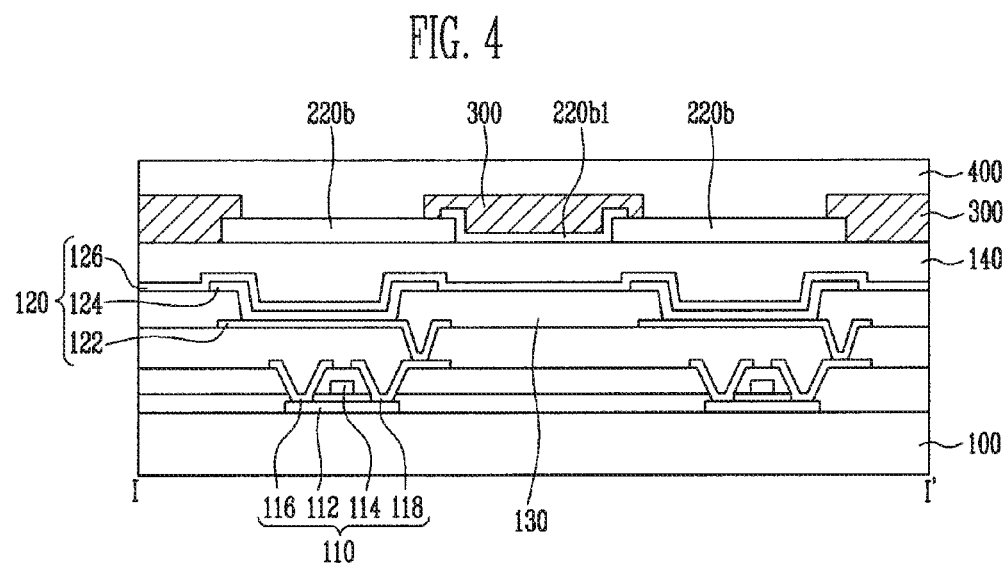
FIG. 4 is a sectional view illustrating a partial region (I-I') of the embodiment illustrated in FIG. 1.

FIG. 4 is a sectional view illustrating a partial region (I-I') of the embodiment illustrated in FIG. 1.

In the embodiment illustrated in FIG. 4, the organic light emitting display is used as the display device. However, the embodiment of the present invention is not limited to the above and may be applied to the display device in which the color filter patterns containing the conductive material are used as the sense electrodes of the touch screen panel.

Also, in the embodiment illustrated in FIG. 4, the organic light emitting display to which an encapsulated thin film is applied is illustrated. However, the embodiment illustrated in FIG. 4 may be applied to the organic light emitting display to which the bottom substrate on which the pixels are formed, and the encapsulated substrate sealed up by sealant are applied.

FIG. 4 is a sectional view illustrating a specific region of the embodiment illustrated in FIG. 1, that is, the region corresponding to the adjacent second sense electrodes 220b and the second connection lines 220b1 for connecting the second sense electrodes 220b.

Here, the second sense electrodes 220b are realized by the color filter patterns (210 of FIG. 1) containing the conductive material, and the color filter patterns 210 are formed to correspond to the emission region of the pixels formed on the bottom substrate 100, that is, an organic light emitting diode (OLED) 120.

In addition, the emission regions of the pixels are realized as anode electrodes 122 connected to drain electrodes 118 of driving transistors 110 provided in the respective pixels, organic light emitting layers 124 formed on the anode electrodes 122 to emit light components of set or predetermined colors, and cathode electrodes 126 formed on the entire surface including the organic light emitting layers 124. The lights emitted through the emission regions of the pixels transmit the color filter patterns 220b (210 of FIG. 1) corresponding to the light components to display a set or predetermined image.

In the embodiment illustrated in FIG. 4, an organic light emitting display is provided. In one embodiment, a plurality of transistors, a capacitor, and an OLED are included in each of the pixels that realize the organic light emitting display.

In FIG. 4, for convenience of description, among the elements included in adjacent pixels, the anode electrodes 122, the organic light emitting layers 124, and the cathode electrodes 126 that realize the OLEDs 120, the driving transistors 110 electrically connected to the anode electrodes 122, the color filter patterns 220b (210 of FIG. 1) formed on the top surfaces corresponding to the OLEDs 120, and the black matrix 300 formed between the color filter patterns will be mainly described.

In the embodiment of the present invention, the conductive material is contained in the color filter patterns so that the color filter patterns are used as the sense electrodes 220b of the touch screen panel, and connection lines 220b1 for electrically connecting the color filter patterns (210 of FIG. 1) as the sense electrodes 220b are provided.

Referring to FIG. 4, the driving transistor 110 provided in each of the pixels includes a semiconductor layer 112 formed on a substrate 100, a gate electrode 114 formed in the region that overlaps the semiconductor layer 112, and source/drain electrodes 116/118 electrically connected to both sides of the semiconductor layer 112.

In addition, the OLED 120 is formed in each of the pixels. The OLED 120 is realized by the anode electrode 122 connected to the drain electrode 118 of the driving transistor 110, the organic light emitting layer 124 formed on the anode electrode 122 to emit light of a set or predetermined color, and a cathode electrode 126 formed on the entire surface including the organic light emitting layer 124.

As illustrated in FIG. 4, the pixels are distinguished from each other by a pixel defining layer (PDL) 130 formed on the side of the anode electrode 122 so that the organic light emitting layer 124 is formed in the region of each of the pixels in which the pixel defining layer 130 is opened. That is, the emission region of each of the pixels is defined by the pixel defining layer 130.

Here, the pixel defining layer 130 may be formed of benzocyclobutene (BCB), acryl based photoresist, phenol based photoresist, and/or imide based photoresist.

In addition, the organic light emitting layer 124 may be formed using a vacuum deposition method, an inkjet print method, and/or a laser thermal transfer method. Furthermore, a hole injection layer, a hole transport layer, a hole suppression layer, an electron transport layer, and/or an electron injection layer may be formed on or under the organic light emitting layer 124.

Also, in the embodiment of the present invention, in order to protect the OLED 120 provided in each of the pixels, an encapsulated thin film 140 is formed on the entire surface of the OLED 120. In order to effectively block oxygen and moisture that may penetrate from the outside, the encapsulated thin film 140 may be realized by a lamination structure of a plurality of organic layers and inorganic layers.

Also, in the embodiment of the present invention, the plurality of color filter patterns 220b (210 of FIG. 1) are formed on the encapsulated thin film 140 to correspond to the plurality of pixels, and the black matrix 300 is formed between the color filter patterns 220b.

Since a comparable organic light emitting display emits red, green, and blue light components through the OLEDs of the pixels, additional color filter patterns are not formed.

However, when the additional color filter patterns are not formed, the contrast of the light components emitted from the OLEDs is significantly reduced in accordance with the intensity of external light. In order to solve the problem, a polarizing plate for blocking external light is to be attached.

That is, the polarizing plate is a circular polarizing plate for blocking external light. The external light incident from the outside is incident through the polarizing plate 150 and the incident external light is reflected by the cathode electrode so that the polarization direction of the external light is changed.

Therefore, the incident external light does not transmit through the polarizing plate so that the external light does not come out and causes extinction interference. Therefore, the external light is blocked to improve contrast.

However, as described above, when the polarizing plate is attached, the thickness of the entire display device increases, which causes a problem in applying a flexible display device that is a recent trend.

That is, in order to realize the flexible display device, the thickness of the entire display device should be several um. However, when a thicker polarizing plate is attached, the flexibility significantly deteriorates.

In one embodiment of the present invention, the color filter patterns (electrodes) 220b (210 of FIG. 1) are formed in the regions corresponding to the pixels in order to solve the problem of deteriorating the contrast of the display device without attaching the polarizing plate.

In the structure of an embodiment of the present invention, the color filter patterns 220b (210 of FIG. 1) absorb the external light, and the external light is blocked through the black matrix 300 formed between the color filter patterns so that it is possible to prevent the contrast from deteriorating without the use of the polarizing plate.

Also, in the embodiment of the present invention, as previously described in more detail, the color filter patterns represent red, green, and blue and contain the conductive material to realize an operation as the sense electrodes 220b of the touch screen panel.

In the embodiment illustrated in FIG. 4, the sense electrodes (second sense electrodes) 220b (formed from the color filter patterns (210 of FIG. 1) containing the conductive material) perform an operation as the sense electrodes of the touch screen panels by being electrically connected to each other by the connection lines (second connection lines) 220b1.

In addition, since the connection lines 220b1 are formed to completely overlap the black matrix 300, it is possible to prevent the connection lines 220b1 from being detected or recognized by the user.

A protecting layer 400 is formed on the entire surface of the sense electrodes 220b and the connection lines 220b1. Therefore, it is possible to realize the display device integrated with the touch screen panel capable of reducing or minimizing the thickness of the entire display device and capable of realizing a flexible characteristic.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device integrated with a touch screen panel, comprising:
    a plurality of pixels on a substrate;
    a plurality of color filter patterns on a surface of the display device, corresponding to the pixels and containing a conductive material; and
    a black matrix between the color filter patterns,
    wherein each of the color filter patterns is electrically connected to an adjacent one of the color filter patterns to become a plurality of sense electrodes of the touch screen panel, and
    wherein the plurality of color filter patterns and the plurality of sense electrodes are same elements, and
    wherein at least a portion of the black matrix is interposed between the color filter patterns.

2. The display device integrated with the touch screen panel as claimed in claim 1,
    wherein the sense electrodes comprise a plurality of first sense electrodes connected to each other in a first direction and a plurality of second sense electrodes connected to each other in a second direction, and
    wherein the first sense electrodes are electrically connected to each other by a plurality of first connection lines for connecting the first sense electrodes in the first direction, and the second sense electrodes are electrically connected to each other by a plurality of second connection lines for connecting the second sense electrodes in the second direction.

3. The display device integrated with the touch screen panel as claimed in claim 2, wherein the first sense electrodes and the second sense electrodes are configured so that the first sense electrodes adjacent in a diagonal direction are connected to each other, and the second sense electrodes adjacent in a diagonal direction are connected to each other.

4. The display device integrated with the touch screen panel as claimed in claim 3, wherein the first sense electrodes are connected to the adjacent first sense electrodes in a form of up and down zigzag, and the second sense electrodes are connected to the adjacent second sense electrodes in a form of side to side zigzag.

5. The display device integrated with the touch screen panel as claimed in claim 2, wherein the first connection lines and the second connection lines are in a region that overlaps the black matrix.

6. The display device integrated with the touch screen panel as claimed in claim 2, wherein an insulating layer is between the first connection lines and the second connection lines in a region where the first connection lines and the second connection lines intersect each other.

7. The display device integrated with the touch screen panel as claimed in claim 2, wherein each of the first and second sense electrodes is realized by a group of color filter patterns containing at least two conductive materials.

8. The display device integrated with the touch screen panel as claimed in claim 7, wherein the color filter patterns included in the group of the color filter patterns realized as one of the first or second sense electrodes are electrically connected to each other by an internal connection pattern.

9. The display device integrated with the touch screen panel as claimed in claim 1, wherein the conductive material comprises metal nano particle, nano wire, and/or graphene.

10. The display device integrated with the touch screen panel as claimed in claim 1, wherein the black matrix is on an entire region excluding the color filter patterns on the same surface as the color filter patterns.

11. The display device integrated with the touch screen panel as claimed in claim 1, wherein each of the pixels comprises an organic light emitting diode (OLED) and a driving transistor connected to the OLED.

12. The display device integrated with the touch screen panel as claimed in claim 11, wherein an encapsulated thin film is on an entire surface of the OLED.

13. The display device integrated with the touch screen panel as claimed in claim 12, wherein the color filter patterns containing the conductive material and corresponding to the plurality of pixels are on the encapsulated thin film.

14. A method of forming of a display device integrated with a touch screen panel, the method comprising:
    forming a plurality of pixels on a substrate;
    forming a plurality of color filter patterns to face the substrate, to correspond to the pixels and to contain a conductive material; and
    forming a black matrix between the color filter patterns,
    wherein the forming of the color filter patterns comprises forming a plurality of sense electrodes of the touch screen panel, and the forming of the sense electrodes comprises electrically connecting each of the color filter patterns to an adjacent one of the color filter patterns,
    wherein the plurality of color filter patterns and the plurality of sense electrodes are same elements, and
    wherein at least a portion of the black matrix is interposed between the color filter patterns.

15. The method as claimed in claim 14,
    wherein the forming of the sense electrodes comprises forming a plurality of first sense electrodes connected to each other in a first direction and a plurality of second sense electrodes connected to each other in a second direction, and wherein the first sense electrodes are formed to be electrically connected to each other by a plurality of first connection lines for connecting the first sense electrodes in the first direction, and the second sense electrodes are formed to be electrically connected to each other by a plurality of second connection lines for connecting the second sense electrodes in the second direction.

16. The method as claimed in claim 15, wherein the first sense electrodes and the second sense electrodes are configured so that the first sense electrodes adjacent in a diagonal direction are connected to each other, and the second sense electrodes adjacent in a diagonal direction are connected to each other.

17. The method as claimed in claim 16, wherein the first sense electrodes are connected to the adjacent first sense electrodes in a form of up and down zigzag, and the second sense electrodes are connected to the adjacent second sense electrodes in a form of side to side zigzag.

18. The method as claimed in claim 15, wherein the first connection lines and the second connection lines are formed in a region that overlaps the black matrix.

19. The method as claimed in claim 15, further comprising:
interposing an insulating layer between the first connection lines and the second connection lines in a region where the first connection lines and the second connection lines intersect each other.

20. The method as claimed in claim 14, wherein the conductive material comprises metal nano particle, nano wire, and/or graphene.

21. A display device integrated with a touch screen panel, comprising:

a plurality of pixels on a substrate;

a plurality of color filter patterns on a surface of the display device, corresponding to the pixels and containing a conductive material; and a black matrix between the color filter patterns, wherein each of the color filter patterns is electrically connected to an adjacent one of the color filter patterns to become a plurality of sense electrodes of the touch screen panel, wherein the plurality of color filter patterns and the plurality of sense electrodes are same elements, wherein the plurality of sense electrodes overlaps emission regions of the plurality of pixels in a direction normal to the surface of the display device, and wherein at least a portion of the black matrix is interposed between the color filter patterns.

* * * * *